United States Patent
Heilig et al.

(10) Patent No.: US 7,239,104 B2
(45) Date of Patent: Jul. 3, 2007

(54) POSITION-DEPENDENT FRICTION COMPENSATION FOR STEERING SYSTEMS

(75) Inventors: Arnulf Heilig, Schwaebisch Gmuend (DE); Stephan Hiegler, Schwaebisch Gmuend (DE); Michael Bischofberger, Schwaebisch Gmuend (DE); Dietmar Hiller, Heuchlingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 11/243,018

(22) Filed: Oct. 3, 2005

(65) Prior Publication Data
US 2006/0076916 A1   Apr. 13, 2006

(30) Foreign Application Priority Data
Oct. 2, 2004   (DE) ............... 10 2004 048 107

(51) Int. Cl.
*B62D 5/04* (2006.01)

(52) U.S. Cl. ............ 318/561; 318/609; 318/632

(58) Field of Classification Search ............ 318/488, 318/489, 560, 561, 565, 568.22, 609–611, 318/619, 626, 632; 180/6.28, 443
See application file for complete search history.

(56) References Cited

U.S. PATENT DOCUMENTS 4,753,310 A * 6/1988 Hashimoto ............ 180/446
4,989,682 A * 2/1991 Takahashi et al. ...... 180/446
5,128,598 A * 7/1992 Avitan .................. 318/587
5,659,473 A * 8/1997 Noro et al. ............. 701/42
6,412,591 B1 7/2002 Endo et al.
6,594,568 B2 * 7/2003 Matsuoka ............... 701/41
6,763,908 B2 * 7/2004 Ogawa et al. .......... 180/446
6,876,910 B2 4/2005 Kifuku
6,879,118 B2 * 4/2005 Cao et al. .............. 318/34
2003/0006088 A1 1/2003 Parker

FOREIGN PATENT DOCUMENTS

| DE | 199 20 975 | 4/2000 |
| DE | 199 56 713 | 6/2000 |
| DE | 100 51 864 | 4/2002 |
| DE | 102 21 678 | 12/2003 |

* cited by examiner

*Primary Examiner*—Bentsu Ro
(74) *Attorney, Agent, or Firm*—Kenyon & Kenyon LLP

(57) ABSTRACT

A method is for compensating for a rotor angle deviation of a motor, which may be used as an actuator, e.g., as a servo actuator, in a steering system. The rotor angle deviation is compensated for by a piecewise linearized control of the difference between a desired rotor angle, which is based on a manual torque and a stored rotor angle, and a measured rotor angle, a control factor of the control being variable as a function of the control range.

19 Claims, 3 Drawing Sheets

POSITION-DEPENDENT FRICTION COMPENSATION FOR STEERING SYSTEMS

CROSS-REFERENCE TO RELATED APPLICATIONS

The present application claims priority to Application No. 10 2004 048 107.5, filed in the Federal Republic of Germany on Oct. 2, 2004, which is expressly incorporated herein in its entirety by reference thereto.

FIELD OF THE INVENTION

The present invention relates to a method for compensating for a rotor angle deviation of a motor and to a steering system.

BACKGROUND INFORMATION

Steering systems such as electronic power steering systems, for example, exhibit deviations between the specified torque determined by the driver of the vehicle and the rotor angle actually set by the steering system. The torque, also called manual torque, is introduced into the steering system via a steering handle such as a steering wheel or a joystick and the like. A desired rotor angle (desired RW) is derivable from the manual torque. In an idealized manner, a linear relationship is assumed between the manual torque and the desired rotor angle. In conventional steering systems, the manual torque is transmitted via a torsion element known as a torsion bar (TB). The driver of the vehicle is supported by an electrical or hydraulic motor or actuator such that the manual torque to be introduced may be lower. The actuator transmits a rotor angle (RW) onto an actuator shaft. In the process, however, the steering system does not follow the specified manual torque completely. The deviations are attributed to numerous causes. Generally, the deviations are attributed to static deviations and dynamic deviations, which, being system-related, are sought in static frictions, in a hysteresis behavior of the steering system, in liquid friction losses, in velocity losses and many other causes.

German Published Patent Application No. 199 56 713 describes an electric power steering device, the control unit of which calculates a current control value for the motor of the power assisted steering device. Deviations of the specified current control value from the actual power steering device control are attributed to additional loads, which are caused by feedback effects of the roadway surface on the rack-and-pinion steering gear. The feedback effects are to be absorbed with the aid of an additional element, an elastic body.

U.S. Patent Application Publication No. 2003/006088 describes a compensation table for the kinetic friction being stored in the engine control unit.

A similar approach is described in German Published Patent Application No. 102 21 678, which attributes the friction in the steering system to a hysteresis torque, which is to be taken into account in the desired torque input. The hysteresis characteristic curve is ascertained as a function of the non-compensated desired torque.

German Published Patent Application No. 199 20 975 subdivides the causes for the friction losses in a more differentiated manner. Five different kinds of friction are distinguished and calculated in terms of control engineering. For this purpose an estimated value is assumed for the static friction. The control provided thus estimates the system deviation of the steering, which has a separately energized DC motor as an actuator.

On the whole, the foregoing steering systems represent an attempt to improve the feel of the steering for a driver of the vehicle. Conventional friction compensations partly have the tendency to overcompensate in the case of steering systems that have little friction.

SUMMARY

An example embodiment of the present invention may provide optimized friction compensation for steering systems.

Since the rotor angle deviation of the motor used in a steering system is controlled in a compensating manner via a piecewise linearized control on the basis of a desired rotor angle and the measured rotor angle, whereby at least of the control factors of the controls is changed as a function a the control range, the control of the steering system may be optimized in the operation of a steering system according to the method of an example embodiment of the present invention. The term "control range" refers to the deviation to be controlled. The control, which operates with actual measured values of the steering system, determines the required compensation. An overcompensation may be clearly reduced if not avoided.

One of the control factors of the control may be changed by a gradient change as a function of the control range. The gradient change may always provide an optimum control factor for the current rotor angle position. It changes continuously within an admissible range of values. If only slight adjustments remain to be made, then the control factor is changed such that a manipulated variable of the control is adjusted only minimally.

According to a design of the control loop of the steering system, the control may be designed such that, when the compensation exceeds the desired rotor angle, the control breaks off the compensation for the rotor angle deviation. This may prevent overcompensation, the so-called overswinging of the control. Steering systems that are only slightly affected by friction are therefore not overcompensated.

In contrast to conventional, very complex control systems, which may make all sorts of estimates using many input variables, the steering system makes do with one single control, which compensates for all friction-related deviations of the rotor angle when a manual torque is applied. The degree of complexity may be reduced, which may have advantageous effects on the stability and the mutual, reinforcing influence.

The controller deliberately has ranges of values in which it no longer operates in a linear manner. It is linearized in a piecewise manner. The linear share of the control may include a controller, which includes at least one controller either of a P-type or of an I-type, e.g., a PI-controller. Using a P-controller, the rotor angle deviation may be quickly eliminated. A PI-controller is used to reduce the system deviation. If the control factor of the I-controller is adjustable, then this may reduce the variability, the overswinging or overcompensating tendency. The variability of the I-controller may be designed such that the control factor of the I-controller in quantitative terms is provided with a maximum control factor in the case of input variables that are in quantitative terms far from zero, and that the controlled system may be provided with variable, that is to say, quantitatively decreasing control factors in an input variable range that is quantitatively near zero. With the quantitative delimitation of the control factor, the control fundamentally may move within a technically meaningful range of values and may not drift into an extreme position.

As a further measure for maintaining the controller within a range of values utilizable by the actuator, the values of the manipulated variable of the control may be limited. The compensation for the rotor angle deviation is limited within an admissible maximum range of values by influencing the manipulated variable via a value limiter. The value limiter has at least three sections or ranges. Within a first range, it operates in a linear manner, and within a second and a third range, the manipulated variable is quantitatively limited to the maximum manipulated variable.

As particular stabilizing measures may be taken on the output side of the controller, the method may also be stabilized by measures for the input variables. Thus in an exemplary embodiment, the manual torque may be quantitatively limited to a maximum value. The control may set in with any change of the manual torque. It may be provided, however, for the control to operate only once a limiting value of the manual torque has been exceeded and to set in only afterwards. Minimal changes may thus be absorbed and the control may not correct itself permanently.

The method may be based on the assumption that a desired rotor angle deviation is determined from the difference of the manual torque with respect to a previously stored manual torque, multiplied by a gear ratio and divided by a factor for the system stiffness.

A first control, the positive compensation control, may be selected if the manual torque is above a threshold value, and a second control, the negative compensation control, may be selected if the magnitude of the manual torque having a negative sign is above a threshold value. For this purpose, the threshold values of the manual torque may be quantitatively identical for the positive and negative compensation.

The foregoing may be used in a steering system, e.g., for motor vehicles such as passenger cars. Their friction-dependent rotor angle deviation may operate according to a method according to an example embodiment of the present invention.

According to an example embodiment of the present invention, a method for compensating for a rotor angle deviation of a motor includes: piecewise linearized controlling of a difference between a desired rotor angle and a measured rotor angle, the desired rotor angle being based on a manual torque on a steering handle and a stored rotor angle, a control factor of the controlling being variable as a function of a control range.

The motor may include an actuator in a steering system.

The control factor may be variable by a gradient change as a function of the control range.

The controlling may include breaking off the compensation for the rotor angle deviation in the event that the compensation exceeds the desired rotor angle.

The controlling may include compensating for all friction-related deviations of the rotor angle under influences of the manual torque.

The controlling may be performed by a controller that includes at least one of (a) a P-controller, (b) an I-controller and (c) a PI-controller.

A controlled system of the I-controller may be provided with a maximum control factor for input variables that are quantitatively far from zero and may be provided with variable, quantitatively decreasing control factors in an input variable range that is quantitatively near zero.

The method may include influencing a manipulated variable by a value limiter within an admissible maximum range of values.

The value limiter may be linear within a first range and limited to the maximum manipulated variable within a second range and a third range.

The method may include quantitatively limiting the manual torque to a maximum value.

The controlling may set in in accordance with a change in the manual torque.

The controlling may set in only when the manual torque exceeds a limiting value.

The method may include determining a desired rotor angle deviation from a difference of the manual torque with respect to a previously stored manual torque, multiplied by a gear ratio and divided by a factor for a system stiffness.

The method may include selecting a first control if the manual torque is above a first threshold value and selecting a second control if a magnitude of the manual torque having a negative sign is above a second threshold value.

The first control may include a positive compensation control.

The second control may include a negative compensation control.

The first threshold value and the second threshold value may be quantitatively identical.

According to an example embodiment of the present invention, a steering system includes: a device adapted to perform piecewise linearized controlling of a difference between a desired rotor angle and a measured rotor angle, the desired rotor angle being based on a manual torque on a steering handle and a stored rotor angle, a control factor of the controlling being variable as a function of a control range.

The steering system may be arranged as a steering system for a motor vehicle.

Example embodiments of the present invention are described in more detail with reference to the appended Figures

DETAILED DESCRIPTION

Figure 1:
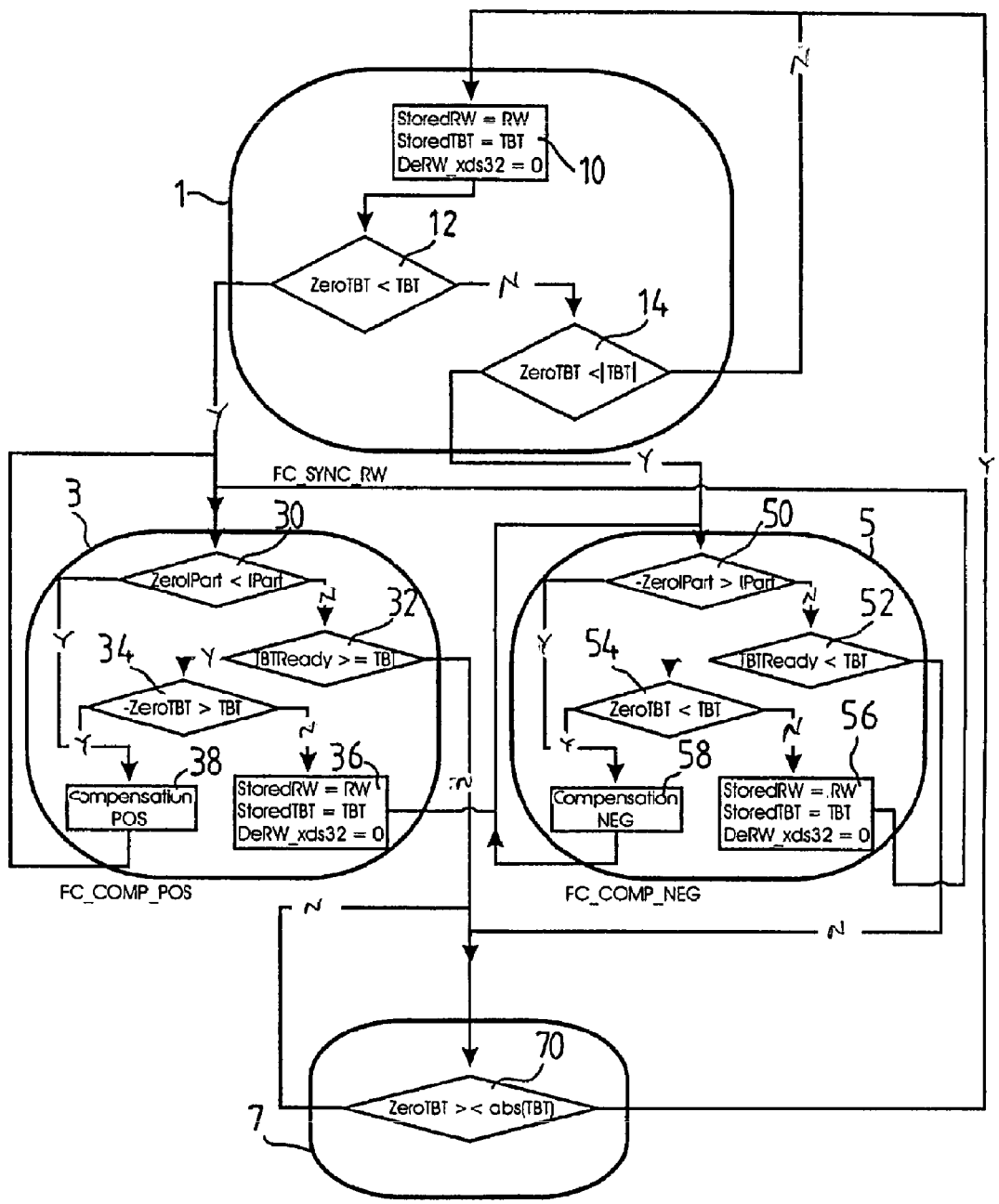
FIG. 1 is a state diagram of a control according to an example embodiment of the present invention.

FIG. 1 illustrates the sequence of a control for steering systems according to an example embodiment of the present invention in the form of a state diagram. In state 1, the current variables are first saved by a recopying process 10 in a recopying and initialization step. Afterwards, a check is performed by a comparison of values as to whether the manual torque introduced, that is, the torque that a driver of the vehicle intends to transmit to the steering system as the selected torque, is to initiate a further processing step in a new state, the control state 3 and the control state 5, so as to result in a control 38, 58, the actual compensation control. Within the scope of the recopying process 10, the values of the rotor angle (RW), of the manual torque (TBT) and of the desired rotor angle (Desired RW or DeRW) are described. The rotor angle (RW) and the manual torque (TBT) are described using the current measured values. The desired rotor angle (DeRW) is set to 0 so that within the context of control 38, 58 it is then able to receive the calculated value. If the manual torque is greater than a limiting manual torque value 12 (ZeroTBT), the system branches into the positive control state 3. If the absolute value of the manual torque is greater than a limiting manual torque value 14, the system branches into the negative control state 5. If the limiting manual torque values (ZeroTBT) are undershot, then the control system remains in state 1, which may also be referred to as an archiving and initialization state for the control.

Figure 2:
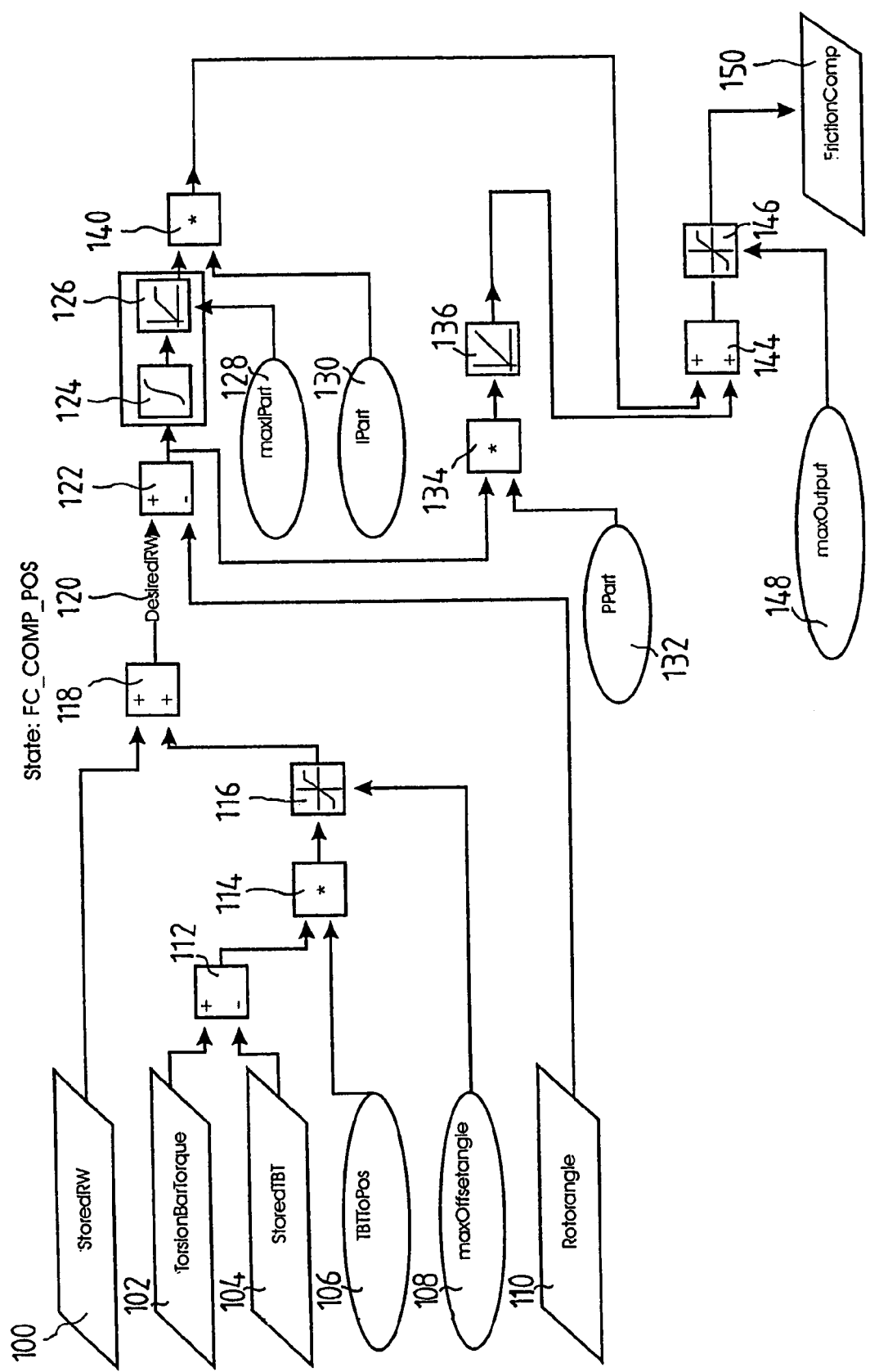
FIG. 2 illustrates a method for compensating for a rotor angle deviation for positive rotor angle deviations.
Figure 3:
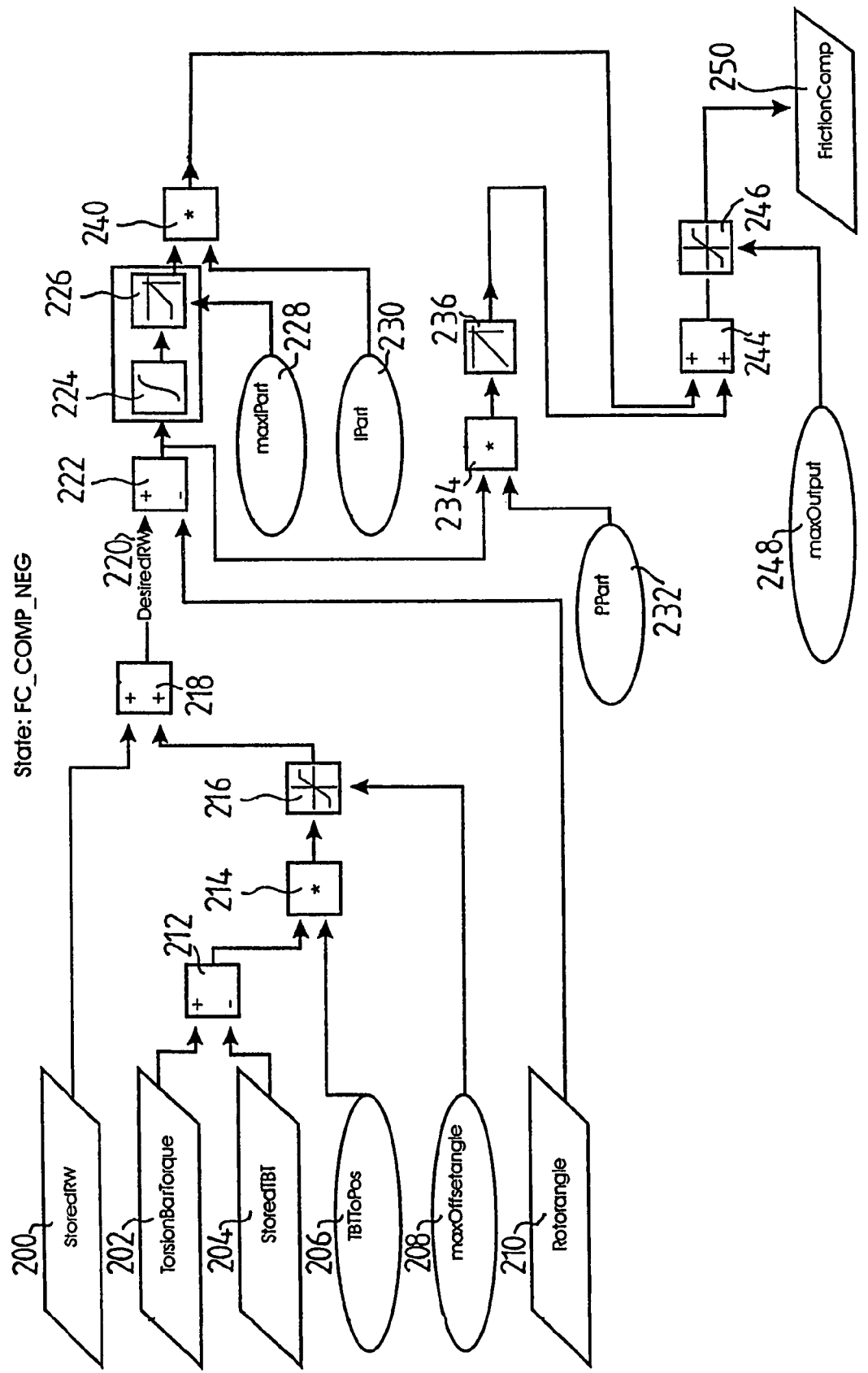
FIG. 3 illustrates a method for compensating for a rotor angle deviation for negative rotor angle deviations.

The continuing specification considers a controller according to FIG. 2 and FIG. 3, which includes an integrator in the form of an I-controller 124, 224 and a proportional controller (P-controller) 136, 236, and which by an addition in adder 144, 244 forms a PI-controller. It should be understood that example embodiments of the present invention are not limited only to PI-controllers, but that in their place PID-controllers or any other kind of control factor-adaptive controller type such as a pure P-controller or a controller of a higher order may be provided. For simplicity, the further remarks are presented for a PI-controller, including an I-controller 124, a P-controller 136 and an adder 144, having positive integration and compensation, or for a PI-controller, including an I-controller 224, a P-controller 236 and an adder 244, having negative integration and compensation.

The two states 3, 5 illustrated in FIG. 1, which yield the positive control state for compensating for a positive friction value, the friction compensation manipulated variable (FrictionComp) 150, and the negative control state for compensating for a negative friction value, the friction compensation manipulated value (FrictionComp) 250, are similar in structure. The different sign in the manual torque (TBT), however, is taken into account by sign multiplication by (−1) or by a reversal of the comparison operators. In states 3, 5, an ascertainment is made in a first comparison 30, 50 as to whether the I-share of the position controller (IPart) is quantitatively higher than a specified I-share for a zero limit (ZeroPart). If the I-share (IPart) is quantitatively above an I-share limit value (ZeroIPart), then the respective compensation control 38, 58 is activated. If the compensation limit for the compensation (TBTReady) exceeds 32 or undershoots 52 the manual torque (TBT) and the limit for the lower manual torque 34, 54 is undershot, then the positive 38 or negative compensation control 58 may be started in states 3, 5. Otherwise a limiting value persistence 70 is checked in safety state 7 or a transition is made from control state 3 to control state 5 or vice versa following a storage step of variables 36, 56.

Favorable limits for a stable state change are limits of approximately 0.1 Nm for example. Below a manual torque (TBT) of approximately 0.1 Nm, the control assumes that the driver of the vehicle did not intend to perform a driving maneuver. As a result, the vehicle becomes more stable overall when there are smaller manual torque fluctuations in straightforward driving. The two control according to FIG. 2 and FIG. 3 are similar. Due to the different signs of the variable of the measured rotor angle (wrsRotrangle) 110, 210, of the manual torque (mstTorsionBarTorque) 102, 202 and of the stored rotor angle (StoredRW) 100, 200, the I-controller 124, 126 illustrated in FIG. 2 or the I-controller 224, 226 illustrated in FIG. 3 and the P-controller 136 illustrated in FIG. 2 or the P-controller 236 illustrated in FIG. 3 are established using positive and negative values. The value of I-controllers 124, 126, 224, 226 is limited in its maximum I-value (IPart) to a maximum value by the limiting value 128, 228 in the limiter of I-controller 126, 226. From the difference between the subtracter 112, 212 of the manual torque (TorsionBarTorque) 102, 202 and the stored manual torque (StoredTBT) 104, 204, a rotor angle, which may be added to the stored rotor angle (StoredRW) 100, 200 by an adder 118, 218, is determined using a position factor (TBTToPos) 106, 206 and an optional value limiter 116, 216 having a limiting value (maxOffsetangle) 100, 200.

Following the addition, controller 38, 58 has the desired rotor angle (DesiredRW) 120, 210 available, from which the measured rotor angle (Rotorangle) 110, 210 is subtracted by a subtracter 122, 222. The signal of subtracter 122, 222 is applied parallel to an I-controller including the elements 124, 126, 224, 226 and to a P-controller 136, 236. The individual signals after the I-controller, including the elements 124, 126, 224, 226, and after the P-controller 136, 236 are added to form a signal of a PI-controller via an adder 144, 244. Multipliers 130, 140, 230, 240, 132, 134, 232, 234 are provided for value adjustment. At the same time, value limiters 146, 148, 246, 248 may stabilize the control and may eliminate its tendency to oscillate.

The measures of stabilization by splitting signals and limiting signals may be optional and may not need to be present for a simple implementation of a control according to an example embodiment of the present invention. Behind adder 144, 244, the friction compensation manipulated value 150, 250 may be read off, which is then applied to an actuator of the steering system.

REFERENCE NUMERAL LISTING STATE 3 control state
5 control state
7 safety state
10 recopying and initialization step
12 limiting manual torque value comparison
14 limiting manual torque value comparison
30 first comparison
32 compensation limit comparison
34 lower manual torque comparison
36 variables storage step
38 compensation control
50 first comparison
52 compensation limit comparison
54 lower manual torque
56 variables storage step
58 compensation control
70 limiting value persistence
100 stored rotor angle
102 manual torque
104 stored manual torque
106 position factor
108 limiting value
110 rotor angle
112 substracter
114 multiplier
116 value limiter
118 adder
120 rotor angle
122 substracter
124 I-controller
126 I-controller
128 limiting value
130 multiplier
132 multiplier
134 multiplier
136 proportional controller
140 multiplier
144 adder
146 value limiter
148 value limiter 150 friction compensation manipulated value
200 stored rotor angle
202 manual torque
204 stored manual torque
206 position factor
208 limiting value
210 rotor angle
212 substracter
214 multiplier
216 value limiter
218 adder
220 rotor angle
222 substracter
224 I-controller
226 I-controller
228 limiting value
230 multiplier
232 multiplier
234 multiplier
236 proportional controller
240 multipliers
244 adder
246 value limiter
248 value limiter
250 friction compensation manipulated value

What is claimed is:

1. A method for compensating for a rotor angle deviation of a motor, comprising:
piecewise linearized controlling of a difference between a desired rotor angle and a measured rotor angle, the desired rotor angle being based on a manual torque on a steering handle and a stored rotor angle, a control factor of the controlling being variable as a function of a control range.

2. The method according to claim 1, wherein the motor includes an actuator in a steering system.

3. The method according to claim 1, wherein the control factor is variable by a gradient change as a function of the control range.

4. The method according to claim 1, wherein the controlling includes breaking off the compensation for the rotor angle deviation in the event that the compensation exceeds the desired rotor angle.

5. The method according to claim 1, wherein the controlling including compensating for all friction-related deviations of the rotor angle under influences of the manual torque.

6. The method according to claim 1, wherein the controlling is performed by a controller that includes at least one of (a) a P-controller, (b) an I-controller and (c) a PI-controller.

7. The method according to claim 6, wherein a controlled system of the I-controller is provided with a maximum control factor for input variables that are quantitatively far from zero and is provided with variable, quantitatively decreasing control factors in an input variable range that is quantitatively near zero.

8. The method according to claim 1, further comprising influencing a manipulated variable by a value limiter within an admissible maximum range of values.

9. The method according to claim 8, wherein the value limiter is linear within a first range and limited to the maximum manipulated variable within a second range and a third range.

10. The method according to claim 1, further comprising quantitatively limiting the manual torque to a maximum value.

11. The method according to claim 1, wherein the controlling sets in in accordance with a change in the manual torque.

12. The method according to claim 1, wherein the controlling sets in only when the manual torque exceeds a limiting value.

13. The method according to claim 1, further comprising determining a desired rotor angle deviation from a difference of the manual torque with respect to a previously stored manual torque, multiplied by a gear ratio and divided by a factor for a system stiffness.

14. The method according to claim 1, further comprising selecting a first control if the manual torque is above a first threshold value and selecting a second control if a magnitude of the manual torque having a negative sign is above a second threshold value.

15. The method according to claim 14, wherein the first control includes a positive compensation control.

16. The method according to claim 14, wherein the second control includes a negative compensation control.

17. The method according to claim 14, wherein the first threshold value and the second threshold value are quantitatively identical.

18. A steering system, comprising:
a device adapted to perform piecewise linearized controlling of a difference between a desired rotor angle and a measured rotor angle, the desired rotor angle being based on a manual torque on a steering handle and a stored rotor angle, a control factor of the controlling being variable as a function of a control range.

19. The steering system according to claim 18, wherein the steering system is arranged as a steering system for a motor vehicle.

* * * * *